March 31, 1964 M. R. TUOZZO 3,126,935

RETRACTABLE SCREW FASTENER

Filed May 23, 1960

INVENTOR.
Michael R. Tuozzo,
BY
Paul & Paul
ATTORNEYS.

3,126,935
RETRACTABLE SCREW FASTENER
Michael R. Tuozzo, Prospect Park, Pa., assignor to South Chester Corporation, Lester, Pa., a corporation of Delaware
Filed May 23, 1960, Ser. No. 30,944
1 Claim. (Cl. 151—69)

This invention relates to a three-part retractable screw fastener assembly, comprising screw, stand-off bushing, and retainer so constructed as to assure that the screw is retained and held captive by the stand-off when the screw is in retracted position.

A retractable screw fastener is a fastening device employed to secure removably a component part to a master unit. In a typical case, the component part may be a panel and the master unit may be a cabinet or main frame. The retractable fastener is employed to secure the panel to the cabinet or frame in such manner that when the screw is retracted from the threaded hole in the frame, thereby to free the panel from the frame, the screw is retained by the panel.

The retractable screw fastener assembly of my present invention includes an improved retainer for assuring that the screw is retained by the panel when the panel is released from the main frame. The three-part fastener is easily assembled, and the retainer, in addition to permanently retaining the screw with the assembly, functions as a seal to prevent passage of water or moisture. It also provides resistance against loosening under vibration.

My invention will be best understood from a consideration of the following detailed description of a preferred embodiment illustrated in the drawing in which.

Figure 1:
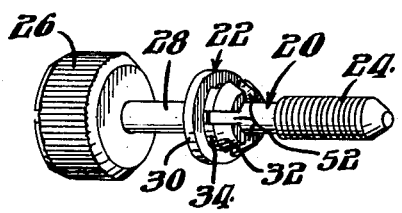
FIG. 1 is a perspective view of the screw and retainer, being two parts of the three-part assembly comprising the retractable screw fastener of my present invention.

In describing the preferred embodiment of my invention as illustrated in the drawing, specific terminology is resorted to for the sake of clarity. However, it is not the intenetion to be limited to the specific terms so selected, and it is to be understood that each specific term includes all technical equivalents which operate in a similar manner to accomplish a similar purpose.

Figure 2:
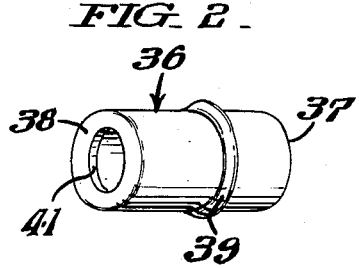
FIG. 2 is a perspective view of the stand-off bushing which is the third part of the three-part assembly.

Referring now to the drawing, FIG. 1 shows two of the three parts which form the retractable screw fastener assembly of my present invention. FIG. 1 shows the screw 20 and the retainer 22. The third part of the assembly, namely, the stand-off bushing or stand-off 36 is shown in FIG. 2.

The screw 20 may be made of any material suitable for threading and which wil perform satisfactorily as a screw. Retainer 22, in accordance with my invention, is made of a flexible resilient material such as hard rubber or plastic, and the like, of which nylon and delrin are preferred. As these materials are resilient, the stored energy of the compressed retainer enables it to resist the vibration forces, thus performing its functions as a vibration resistant lock-washer and as a fluid and moisture sealing element, as well as preventing the screw from escaping from the bushing. Stand-off 36 may be made of any material, plastic or metal, and the like, of which stainless steel, steel, or brass are preferred.

Figure 6:
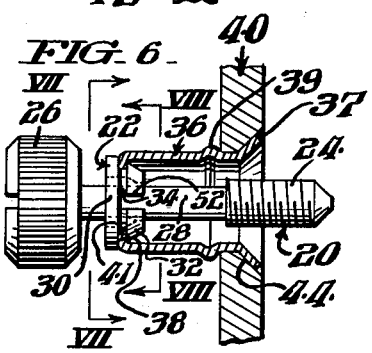
FIG. 6 shows the screw and retainer after insertion into the stand-off.
Figure 7:
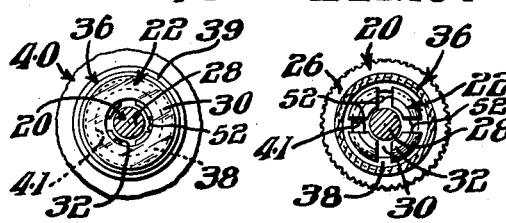
FIG. 7 is a view along the line VII—VII of FIG. 6 looking in the direction indicated by the arrows.

In accordance with my invention, flexible retainer 22 has an axial bore and a slotted frusto-conical shape at one end so as to form barbs 32 which may be compressed circumferentially to prevent withdrawal of the retainer 22 from the stand-off (FIG. 6).

Also, in accordance with my invention, the bore of retainer 22 is tapered inwardly at the frusto-conical or barb end. The construction and flexible resilience of retainer 22 is such that, in response to an axial force in the bore in the direction toward the frusto-conical end, the barbs expand circumferentially to permit the enlarged threaded end portion 24 of the screw 20 to pass through the bore in the direction from left to right as viewed in FIG. 1, but the retainer 22 strongly resists passage of the threaded portion 24 through its bore in the opposite direction (from right to left as viewed in FIG. 1). Thus, while the retainer 22 may be readily passed axially over the threaded portion 24 of screw 20 so as to take up a position on the reduced-diameter throat or shank 28 of the screw 20, the retainer 22 cannot thereafter be readily withdrawn from the screw 20 by a mere axial force (as distinguished from a force acting spirally) since the retainer strongly resists axial passage of the threaded portion 24 of the screw 20 in the direction necessary for withdrawal. And, if the retainer 22 cannot be withdrawn from the screw 20 by a mere axial force, it follows that the screw 20 cannot be withdrawn from the retainer 22 by a mere axial force.

It will be seen then that if, while occupying a position on the throat or shank 28 of screw 20, the retainer 22 is pressed into and secured in the stand-off 36 by the action of the barbs 32, the screw 20 will be effectively retained in the stand-off. It follows, then that if the stand-off 36 is at that time secured in a panel, such as panel 40 (FIGS. 3–6) the screw 20 will be held captive by the panel.

Stand-off bushing 36, as shown in FIG. 2, is of generally tubular shape, being completely open at one end 37, and partially closed at the other end by an annular flange 38 forming the axial opening 41. The stand-off 36 includes a circumferential collar or shoulder 39 formed in the tubular bushing at a selected distance from the open end 37.

Figure 3:
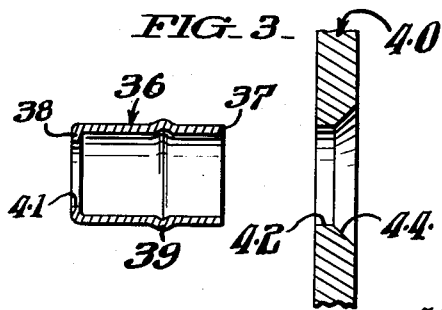
FIG. 3 is a view in section of the stand-off and of a panel into which the stand-off is to be inserted.

In using the retractable screw fastener assembly of my present invention, the stand-off 36 is first inserted into a hole previously drilled or punched in the panel 40, as seen in FIG. 3. The hole 42 may preferably be flared as at 44 on the rear side of the panel, as by countersinking.

Figure 4:
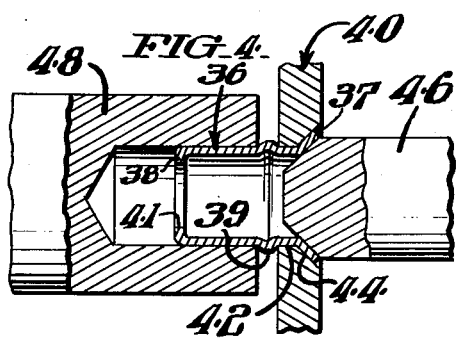
FIG. 4 illustrates one manner in which the stand-off may be inserted into and secured in the panel.

The manner in which the stand-off 36 may be secured in the panel 40 is illustrated in FIG. 4. In practice, stand-off bushings will be available in various sizes, including various lengths between collar 39 and open end 37. The stand-off selected for use in panel 40 will have a dimension between the open end 37 and the shoulder 39 substantially equal to the thickness of the panel 40. A back-up tool 48 may conveniently be employed to hold the stand-off 36 while a flaring punch 46 is employed to flare out the open end 37 to form the flared portion 44, thereby to secure the stand-off firmly in the panel 40. Alternatively, while not illustrated, the hole 42 need not be countersunk, and the open end 37 of the stand-off may merely be turned back over the back surface of the panel.

After securing the stand-off 36 in the panel 40, or prior thereto if desired, the retainer 22 is placed onto the screw 20 by merely pushing the threaded portion 24 of the screw in an axial direction through the bore of the retainer 22 until the retainer arrives at the smaller-diameter throat or shank 28 of the screw. Since the movements of retainer 22 and screw 20 just referred to are relative, it will be somewhat more convenient, in describing the action, to assume that the retainer 22 is pushed over the threaded portion 24 in the direction from right to left as viewed in FIG. 1. The details of this action are illustrated in FIGS. 10 and 11.

Figure 8:
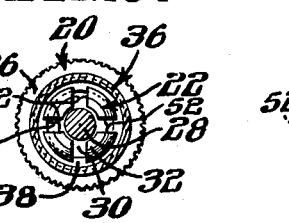
FIG. 8 is a view along the line VIII—VIII of FIG. 6 looking in the direction indicated by the arrows.
Figure 10:
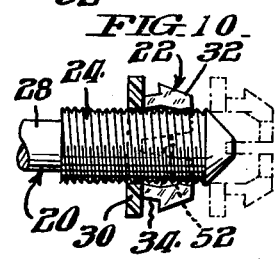
FIG. 10 illustrates the manner in which the retainer may be placed onto the screw.

Referring now to FIG. 10, the retainer 22 shown in dot-and-dash lines represents the position of the retainer as it is about to be pushed axially from right to left over the threaded portion 24 of the screw 20. It will be seen that the bore of the enlarged annular front portion 30, and also the bore of the recessed intermediate portion 34, is large enough to receive and to pass the enlarged threaded portion 24 of the screw 20. The slotted frusto-conical portion 32 of the retainer is, however, inclined inwardly toward the axis and has a gradually reducing bore whose minimum diameter is substantially smaller than that of the threaded portion 24 of the screw. However, when the retainer 22 is pushed to the left, as viewed in FIG. 10, over the threaded portion of the screw, the frusto-conical portion 32, by reason of being formed of flexible resilient material and by reason of being slotted, expands circumferentially, as shown in FIG. 10 by the solid-line representation of the retainer. Preferably, the slots 52 extend not only through the frusto-conical portion 32 but also into and through the recessed intermediate portion 34. In the illustrated embodiment, as clearly seen in FIG. 8, the slots 52 occur at ninety-degree intervals, thus dividing the frusto-conical and recessed portions of the retainer into four equal sections, and thus forming the barbs 32. It is to be understood, however, that the radial slots may be on other circumferential spacings than ninety degrees and yet be satisfactory.

Figure 11:
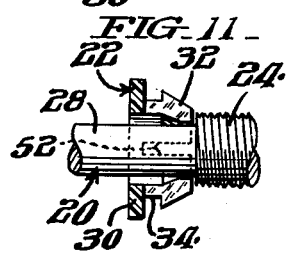
FIG. 11 shows the retainer after it has been placed onto the screw.

Referring now to FIG. 11, it will be seen that after retainer 22 has completed its passage over the threaded portion 24 of the screw and arrived at the smaller-diameter throat or shank portion 28, the resilient retainer retracts or collapses circumferentially to its normal shape. If now an attempt be made to pull the retainer axially back over the enlarged threaded portion 24 of the screw (from left to right as viewed in FIG. 11), it will be found that the retainer 22 resists very strongly any effort to move it in that direction. In fact, it will be found that it is very difficult to remove the retainer 22 from the shank portion 28 without also rotating the retainer axially while pulling thereon, thereby to impart to it a spiral motion.

While the retainer 22, by itself, offers strong resistance to removal from the shank 28 of the screw by any force tending merely to pull it in an axial direction over the enlarged threads 24, as just described, such resistance to removal becomes even greater after the retainer is snapped into place in the stand-off 36, as will be described, since the recessed portion 34 of the retainer is then embraced by the rim of the flange 38 of the stand-off and circumferential expansion of the frusto-conical portion or barbs 32 of the retainer is prevented.

Figure 5:
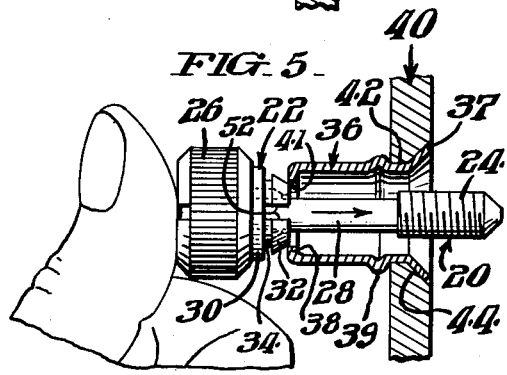
FIG. 5 illustrates the manner in which the screw and retainer are inserted into the stand-off.

With stand-off 36 secured to panel 40, as by the method previously described or by any other suitable method, and with the retainer 22 on the throat or shank portion 28 of the screw 20, the threaded portion 24 of the screw is passed through the hole 41 of the stand-off 36 until the retainer 22 is pushed back against the under flat surface of the head 26 of the screw. In response to further pressure, applied as by the thumb against the head 26 of the screw as illustrated in FIG. 5, the inwardly-inclined outer surface of the frusto-conical portion 32 of the retainer 22 is forced against the rim of the annular flange 38 of the stand-off 36 and the frusto-conical portion or barbs 32 are cammed or wedged circumferentially inwardly, thereby permitting the barbs to pass through the opening 41. As soon as the barbs 32 clear the annular flange 38, the resilience of the retainer material causes the barbs to snap circumferentially outwardly, leaving the flange 38 embracing the recessed portion 34, as clearly seen in FIG. 6.

It will be seen that after the retainer has been inserted into the stand-off 36 and is in the position illustrated in FIG. 6, it is virtually impossible for the screw 20 to escape from the stand-off. This follows from the fact that the minimum bore at the frusto-conical end of the retainer 22 is substantially smaller than the outer diameter of the threaded portion 24 of the screw, and from the further fact that the frusto-conical portion is prevented from expanding circumferentially outwardly by the annular flange 38 which surrounds and embraces the recessed portion 34 of the retainer.

Figure 9:
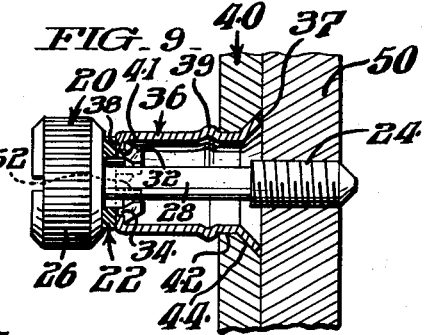
FIG. 9 shows the retractable screw fastener holding a panel to a main frame.

FIG. 9 illustrates the manner in which the retractable screw fastener assembly of my present invention may be used to secure removably panel 40 to a main frame 50. It will be seen that the screw 20 may be rotated counter-clockwise until the threaded portion 24 is removed from the threaded hole in main frame 50, thereby releasing panel 40 from the main frame but without permitting the screw 20 to become free of the stand-off bushing 36. Hence, the screw 20 is retained by the panel.

While the preferred embodiment of my present invention has been described in some detail, it will be obvious to one skilled in the art that various modifications may be made without departing from the invention as hereinafter claimed.

Having thus described my invention, I claim:

A vibration-tight, fluid-tight, retractable screw fastener comprising; a screw having a threaded portion at one end and a head at the other separated from said threaded portion by a shank of reduced diameter relative to both said head and threaded portion; a retainer of flexible resilient non-metallic material having a circumferentially continuous disk-like front portion, a frusto-conical rear portion and a recessed intermediate portion of circular periphery, the larger diameter end of said frusto-conical portion being adjacent said recessed portion, said retainer having a bore therethrough, said bore through said front and intermediate portions having a diameter as large as that of the threaded portion of said screw, said bore tapering in the frusto-conical portion from the intermediate portion to the end remote from the front portion to a diameter substantially smaller than that of said threaded portion of said screw, the frusto-conical and intermediate portions of said retainer being slotted radially at spaced circumferential intervals for permitting said slotted frusto-conical portion to be expanded circumferentially outwardly in response to an axial force exerted against the wall of said tapered bore, thereby to permit the threaded portion of said screw to be passed through said bore only in the direction from said disk-like front portion to said rear frusto-conical portion; and a stand-off bushing of general tubular configuration having at one end an annularly-flanged opening substantially equal in diameter to the outer diameter of said recessed portion of said retainer, said flanged opening in said standoff bushing being larger in diameter than the smaller outer diameter of the frusto-conical portion of said retainer but smaller than the larger outer diameter of said frusto-conical portion and substantially smaller than the outer diameter of the disk-like front portion of said retainer, said bushing having means at the other end for securing it to a workpiece, said bushing being shorter in length than said screw whereby the threaded portion of said screw can project from the bushing.

References Cited in the file of this patent

UNITED STATES PATENTS

| | | |
|---|---|---|
| 1,179,597 | Zahner | Apr. 18, 1916 |
| 1,755,590 | Carr | Apr. 22, 1930 |
| 2,826,231 | Alden | Mar. 11, 1958 |
| 2,948,317 | Munro | Aug. 9, 1960 |

FOREIGN PATENTS

| | | |
|---|---|---|
| 604,017 | Great Britain | June 28, 1948 |
| 720,884 | Great Britain | Dec. 29, 1954 |